(12) United States Patent
Takahashi

(10) Patent No.: US 7,139,425 B2
(45) Date of Patent: Nov. 21, 2006

(54) METHOD AND APPARATUS FOR CORRECTING WHITE BALANCE, METHOD FOR CORRECTING DENSITY AND A RECORDING MEDIUM ON WHICH A PROGRAM FOR CARRYING OUT THE METHODS IS RECORDED

(75) Inventor: Koji Takahashi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 688 days.

(21) Appl. No.: 09/939,703

(22) Filed: Aug. 28, 2001

(65) Prior Publication Data

US 2002/0044685 A1 Apr. 18, 2002

(30) Foreign Application Priority Data

Aug. 28, 2000 (JP) ............................. 2000-257469
Mar. 15, 2001 (JP) ............................. 2001-074170

(51) Int. Cl.
*G06K 9/00* (2006.01)

(52) U.S. Cl. ............................................. 382/167

(58) Field of Classification Search .............. 382/167, 382/166, 248, 168; 358/516, 518; 348/225.1, 348/224.1, 222.1, 223.1, 223, 231.6; 362/293, 362/17, 18, 318

See application file for complete search history.

(56) References Cited

U.S. PATENT DOCUMENTS

| | | | | |
|---|---|---|---|---|
| 4,203,671 A | | 5/1980 | Takahashi et al. | |
| 5,168,303 A | * | 12/1992 | Ikenoue et al. | ............... 355/38 |
| 5,351,079 A | * | 9/1994 | Usui | ....................... 348/223.1 |
| 5,420,630 A | * | 5/1995 | Takei | ....................... 348/223.1 |
| 5,781,276 A | | 7/1998 | Zahn et al. | |
| 5,831,672 A | * | 11/1998 | Takei | ....................... 348/225.1 |
| 6,160,579 A | * | 12/2000 | Shiraiwa et al. | ......... 348/224.1 |
| 6,545,710 B1 | * | 4/2003 | Kubo et al. | ............. 348/223.1 |
| 6,559,826 B1 | * | 5/2003 | Mendelson et al. | ......... 345/102 |
| 2002/0018129 A1 | * | 2/2002 | Ikeda | ......................... 348/223 |

FOREIGN PATENT DOCUMENTS

| | | |
|---|---|---|
| EP | 0 530 793 A2 | 3/1993 |
| EP | 0 658 058 A2 | 6/1995 |

* cited by examiner

Primary Examiner—Jingge Wu
Assistant Examiner—Ali Bayat
(74) Attorney, Agent, or Firm—Sughrue Mion, PLLC (57) ABSTRACT

The method and the apparatus which correct white balance estimate, by using at least gray and/or skin color information contained in an input color image, a color temperature of a photographing light source with which the color image has been formed and correct an image signal of the color image on the basis of the estimated color temperature. The density correcting method multiplies image signals of each pixel in the input color image by set coefficients to detect pixels having the multiplied image signals in the vicinity of a blackbody locus curve of skin color as skin color candidate pixels and assigns an average obtained for a predetermined color signal from the skin color candidate pixels detected to a predetermined density of a color corresponding to the color signal on a print. These methods and the apparatus are effective in properly correcting white balance and density upon forming a print from an input image.

18 Claims, 6 Drawing Sheets

METHOD AND APPARATUS FOR CORRECTING WHITE BALANCE, METHOD FOR CORRECTING DENSITY AND A RECORDING MEDIUM ON WHICH A PROGRAM FOR CARRYING OUT THE METHODS IS RECORDED

BACKGROUND OF THE INVENTION

1. Field of the Invention

The present invention relates to a technique for correcting white balance and density of a color image when digital image processing is performed on an input image signal to form a print, more particularly, to a method and an apparatus for correcting white balance, a method for correcting density and a recording medium on which a program for carrying out these methods is recorded.

2. Description of the Related Art

The conventional silver salt photography generally uses an analog exposure (area exposure or direct exposure) system to obtain a print. That is, a developed negative film is positioned at a predetermined printing position and irradiated with light from a white light source (halogen lamp or the like), and light transmitted through the negative film is imaged on photographic paper, thus making an exposure.

In recent years, printing apparatuses using digital exposure, i.e., digital photoprinters, have been put to practical use. Digital photoprinters perform a process in which an image recorded on a photographic film such as a negative film or a color reversal film is photoelectrically read to obtain a digital signal representing the read image, various kinds of image processing is performed on the digital signal to obtain image data, scanning exposure using recording light modulated according to this image data is performed on a photosensitive material to form an image (latent image) on the photosensitive material to obtain a (finished) print.

Such digital photoprinters process images as digital image data and can therefore perform image processing not only on photographed images on photographic films but also on photographed images obtained with digital still cameras (DSC) or the like, image data recording in the form of digital data on various kinds of recording media, e.g., magnetic recording media, such as CD-R (compact disk recordable), floppy disks, and removable hard disks (Zip, Jaz, etc.), and MO disks (magneto-optical recording media) to output prints.

Color negative films have been commonly used by typical users. The conditions of photography of original images on negative films are not always uniform. For example, subjects are photographed in light from various light sources, e.g., daylight and fluorescent lamp. Therefore, in case of forming prints from a developed negative film when images in the developed negative film is printed without changing the characteristics of light from a printing light source, color tints of light from photographing light sources in which subjects have been photographed are directly reflected in the prints, which leads to forming undesirable prints in some cases.

Various systems have therefore been contrived to adjust white balance on the prints. A typical example of such systems is a large area transmission density (LATD) method based on the Evans' theorem (hypothesis) stating that the average of all colors in the world is gray. The LATD is the average transmission density through an entire frame on a photographic film. In the LATD method, the LATD of each frame on a color negative film is measured and the characteristics of a printing light source are changed according to the red, green and blue density levels so that the average color on the print is close to gray.

On the other hand, digital still cameras (DSCs) have recently come into widespread use. An image forming process in a DSC and an image forming process using a color negative film can be regarded as the same with respect to photographing a scene but differ essentially in that a DSC image itself is an object of appreciation while an image on a color negative film is not directly viewed as an object of appreciation. DSC images themselves, therefore, must be fine, well-white-balanced images when viewed before being output as prints. DSCs are also used for photography with various light sources like cameras using color negative films and are unable to reliably obtain a satisfactory image without a function for correcting white balance. Therefore almost all the recent DSCs have an auto white balance (AWB) function for automatically correcting white balance.

The above-described LATD method has been practiced with some measure of success but it is responsible for production of undesirable prints. One of the printing failures due to the LATD method is color failure that imbalance of a color occurs in a print. For example, in a case where white balance correction based on the LATD method is made on an image obtained by photographing a woman in red dress, a cyan color, which is a complementary color to red, is added throughout the entire frame to make the entire frame close to gray, thereby reducing the vividness of the red of the dress and making the woman's face pale.

In a case where the entire frame area of a photographed scene is reddish, it is impossible to ascertain whether the reddishness is ascribable to the light source or the subject. In this case, the LATD method achieves success in correction if the light source is the cause, but it causes such a color failure described above if the subject is the cause.

The above-mentioned AWB function of DSCs is essentially based on the Evans' theorem like the negative film/printing system and entails the same problem as that of white balance correction based on the LATD in the negative film/printing system.

That is, while about 60 to 70% of DSC images after AWB are obtained as well-color-balanced good images as average performance of the Evans' theorem, the remaining 30 to 40% of the DSC images need some additional color balance correction because of AWB function failure. If white balancing is not performed at the time of printing from the DSC images, about 30 to 40% of resulting prints are unsatisfactory, unacceptable prints.

As described above, the conventional art LATD method based on the Evans' theorem makes white balance correction by assuming that the average of colors through the entire frame of an image is gray, but it is not sufficiently effective in correcting white balance because of its inability to find true gray in an image, and often produces a contrary correction effect.

Further, when printing, if LATD method as above is employed to perform density correction through the entire image the density of a main subject or a principal subject in the image will be influenced by scene configurations and a print may be formed with an improper density. In order to overcome such a problem, it has been proposed to detect a main subject (a human face in many cases) in an image and determine the print density in accordance with the density of the detected subject. The judgment on whether or not the print density is proper is made based on the density of a main subject rather than the density through an entire frame. Consequently, it is important to detect a human face as a main subject and correct the density of the entire image so that the density of the face may be proper.

Detection of a human face as a main subject is generally performed employing shape recognition. However, it is very difficult at present to detect human faces with high accuracy by employing such measures. It has also been attempted to detect human faces using color information, where difficulties may again occur, if the type of a light source is unknown.

SUMMARY OF THE INVENTION

In view of the above-described problem of the conventional art, it is a first object of the present invention to provide a technique for a method and an apparatus for correcting white balance capable of properly correcting white balance at a high hit rate when digital image processing is performed on input image data to form a print.

It is a second object of the present invention to provide a technique for a method for correcting density capable of detecting skin-colored areas in an image and making the print density proper on the basis of information obtained from the detected areas, which technique is advantageously used if the type of a light source is unknown.

It is a third object of the present invention to provide a recording medium on which a program capable of carrying out at least one of the white balance correcting method and the density correcting method is recorded.

In order to attain the first object described above, the first aspect of the present invention provides a method of correcting white balance, comprising the steps of: estimating, by using at least gray and/or skin color information contained in an input color image, a color temperature of a photographing light source with which a color image has been formed; and correcting an image signal of the color image based on the estimated color temperature.

Preferably, only the gray and skin color information is used.

Preferably, the estimating step includes: multiplying image signals of each pixel in the input color image by set coefficients; setting pixels having the multiplied image signals in the vicinity of a blackbody locus curve of skin color as skin color candidate pixels and/or pixels having the multiplied image signals in the vicinity of a blackbody locus curve of gray as gray candidate pixels; optimizing the set coefficients so that the number of the skin color candidate pixels and/or the gray candidate pixels is maximized; obtaining a group of skin color candidate pixels and/or a group of gray candidate pixels by using the optimized set coefficients; and estimating the color temperature of the photographing light source from an average color temperature of the group of skin color candidate pixels and/or an average color temperature of the group of gray candidate pixels, and wherein the image signals of the color image multiplied by the optimized set coefficients are corrected by an amount corresponding to a difference between the estimated color temperature and a color temperature of reference white.

Preferably, the color temperature of the photographing light source is estimated from the average color temperature of the group of skin color candidate pixels and the average color temperature of the group of gray candidate pixels obtained by optimizing the set coefficients so that the number of the skin color candidate pixels and the gray candidate pixels is maximized.

Preferably, the estimating step includes: multiplying image signals of each pixel in the input color image by set coefficients; setting pixels having the multiplied image signals in the vicinity of a blackbody locus curve of skin color as skin color candidate pixels and pixels having the multiplied image signals in the vicinity of a blackbody locus curve of gray as gray candidate pixels; optimizing the set coefficients so that a difference between an average color temperature of the skin color candidate pixels and an average color temperature of the gray candidate pixels is minimized; obtaining a group of skin color candidate pixels and a group of gray candidate pixels by using the optimized set coefficients; and estimating the color temperature of the photographing light source from the average color temperature of the group of skin color candidate pixels and the average color temperature of the group of gray candidate pixels, and wherein the image signals of the color image multiplied by the optimized set coefficients are corrected by an amount corresponding to a difference between the estimated color temperature and a color temperature of reference white.

Preferably the estimating step includes: multiplying image signals of each pixel in the input color image by set coefficients; setting pixels having the multiplied image signals in the vicinity of a blackbody locus curve of skin color as skin color candidate pixels and pixels having the multiplied image signals in the vicinity of a blackbody locus curve of gray as gray candidate pixels; optimizing the set coefficients so that the number of the skin color candidate pixels and the gray candidate pixels is maximized and a difference between an average color temperature of the skin color candidate pixels and an average color temperature of the gray candidate pixels is minimized; obtaining a group of skin color candidate pixels and a group of gray candidate pixels by using the optimized coefficients; and estimating the color temperature of the photographing light source from the average color temperatures of the group of skin color candidate pixels and the group of gray candidate pixels, and wherein the image signals of the color image multiplied by the optimized set coefficients are corrected by an amount corresponding to a difference between the estimated color temperature and a color temperature of reference white.

Preferably, when each of the blackbody locus curve of the skin color and the blackbody locus curve of the gray is set, a spectral sensitivity of a photographing apparatus used to form the input color image is used as a spectral sensitivity distribution.

Preferably, when each of the blackbody locus curve of the skin color and the blackbody locus curve of the gray is set, a spectral sensitivity of BT709 is used as a spectral sensitivity distribution.

In order to attain the first object described above, the second aspect of the present invention provides an apparatus for correcting white balance when digital image processing is performed on an input color image to form a print, comprising: an estimation device for estimating, by using at least gray and/or skin color information contained in the input color image, a color temperature of a photographing light source with which a color image has been formed; and a correction device for correcting an image signal of the color image based on the estimated color temperature.

Preferably, the estimation device includes: a multiplication device for multiplying image signals of each pixel in the input color image by set coefficients; a detection device for detecting pixels having the multiplied image signals in the vicinity of a blackbody locus curve of skin color as skin color candidate pixels, and pixels having the multiplied signals in the vicinity of a blackbody locus curve of gray as gray candidate pixels; an optimization device for optimizing the set coefficients so that the number of the skin color candidate pixels and the gray candidate pixels is maximized and so that a difference between an average color temperature of the skin color candidate pixels or for optimizing the set coefficients so that an average color temperature of the gray candidate pixels is minimized, to obtain a group of skin color candidate pixels and a group of the gray candidate pixels, or for both optimizing; and a computation device for calculating the color temperature of the photographing light source from the average color temperature of the group of skin color candidate pixels and the average color temperature of the group of gray candidate pixels, and wherein the correction device corrects the image signals of the color image multiplied by the optimized set coefficients, by an amount corresponding to a difference between the estimated color temperature and a color temperature of reference white.

In order to attain the second object described above, the third aspect of the present invention provides a method of correcting density, comprising the steps of: multiplying image signals of each pixel in an input color image by set coefficients to detect pixels having the multiplied image signals in the vicinity of a blackbody locus curve of skin color as skin color candidate pixels; and assigning an average obtained for a predetermined color signal from the skin color candidate pixels detected to a predetermined density of a color corresponding to the color signal on a print.

Preferably, the predetermined color signal is a green signal and an average green signal obtained from the skin color candidate pixels detected is assigned to a predetermined green density on a print.

Preferably, the predetermined green density is 0.7–1.0.

In order to attain the third object described above, the fourth aspect of the present invention provides a recording medium on which one or both of a method of correcting white balance and a method of correcting density are recorded in a computer-readable manner as a program to be executed by a computer, wherein the method of correcting the white balance, comprising the steps of: estimating, by using at least gray and/or skin color information contained in an input color image, a color temperature of a photographing light source with which a color image has been formed; and correcting an image signal of the color image based on the estimated color temperature, and wherein the method of correcting the density, comprising the steps of: multiplying the image signals of each pixel in the input color image by the set coefficients to detect the pixels having the multiplied image signals in the vicinity of the blackbody locus curve of the skin color as the skin color candidate pixels; and assigning an average obtained for a predetermined color signal from the skin color candidate pixels detected to a predetermined density of a color corresponding to the color signal on a print.

DETAILED DESCRIPTION OF THE PREFERRED EMBODIMENTS

The apparatus for correcting white balance, the method for correcting white balance and the method for correcting density, as well as the recording medium on which a program for carrying out these methods is recorded, all of which the present invention provides, will be described below in detail with reference to preferred embodiments of the invention shown in the accompanying drawings.

Figure 1:
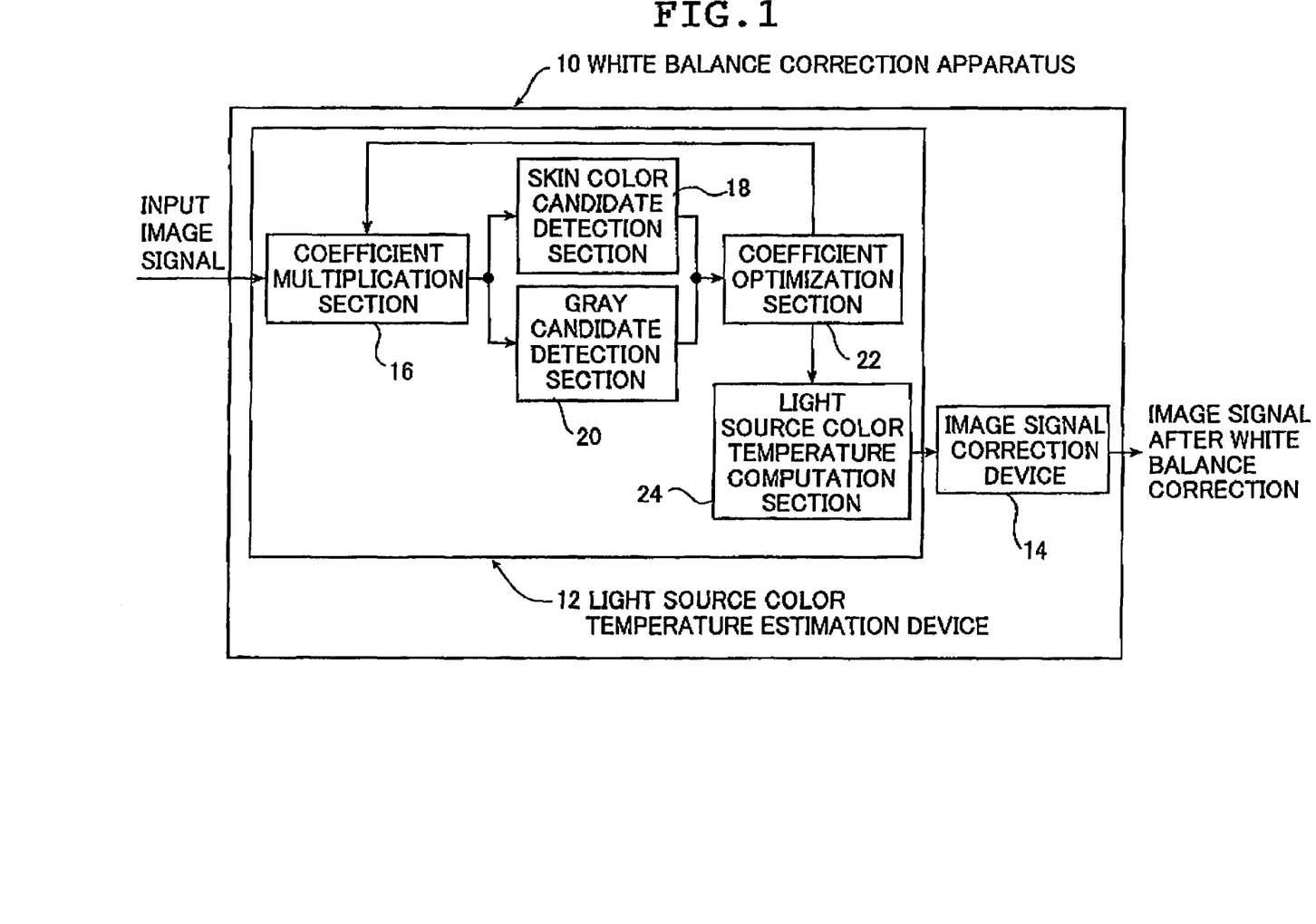
FIG. 1 is a block diagram schematically showing an embodiment of a white balance correction apparatus in accordance with the present invention.

FIG. 1 is a block diagram schematically showing an embodiments of a white balance correction apparatus in accordance with the present invention.

The white balance correction apparatus shown in FIG. 1 is arranged to correct white balance when digital image processing is performed on input image signal to form a print. For example, it is provided in an image processor such as a digital photoprinter.

The white balance correction apparatus indicated by 10 in FIG. 1 is constituted mainly of a light source color temperature estimation device 12 for estimating, from an input color image, the color temperature of a light source at the time of obtaining the color image by photographing a subject, and an image signal correction device 14 for making white balance correction by using the color temperature of the photographing light source estimated by the light source color temperature estimation device 12.

The light source color temperature estimation device 12 has a coefficient multiplication section 16, a skin color candidate detection section 18, a gray candidate detection section 20, a coefficient optimization section 22, and a light source color temperature computation section 24.

Before describing the functions of these devices and sections, the principle of the present invention will first be described.

While the conventional white balance correction method corrects a color imbalance on the basis of the Evans' theorem so that the average of colors through the entire frame is gray, the present invention is characterized by positively searching for a gray portion in a frame and by correcting an imbalance by performing exposure so that the gray candidate point is finished in gray on a print.

The same white balance correction method is applied to an image forming process using a color negative film and to an image forming process in a digital still camera (DSC). The principle of the present invention will be explained with respect to a case where a scene is photographed with a DSC under ordinary conditions.

A case where a scene containing a gray portion (in gray or in a color close to gray) is photographed with a DSC in natural daylight at a color temperature of 4000K will be considered.

Image signals (R, G, B) of the photographed gray portion are plotted in a chromaticity diagram by being converted into chromaticity coordinates (r, b) by the following equations (1):

$r = R/(R+G+B)$ $b = B/(R+G+B)$ (1)

Figure 2:
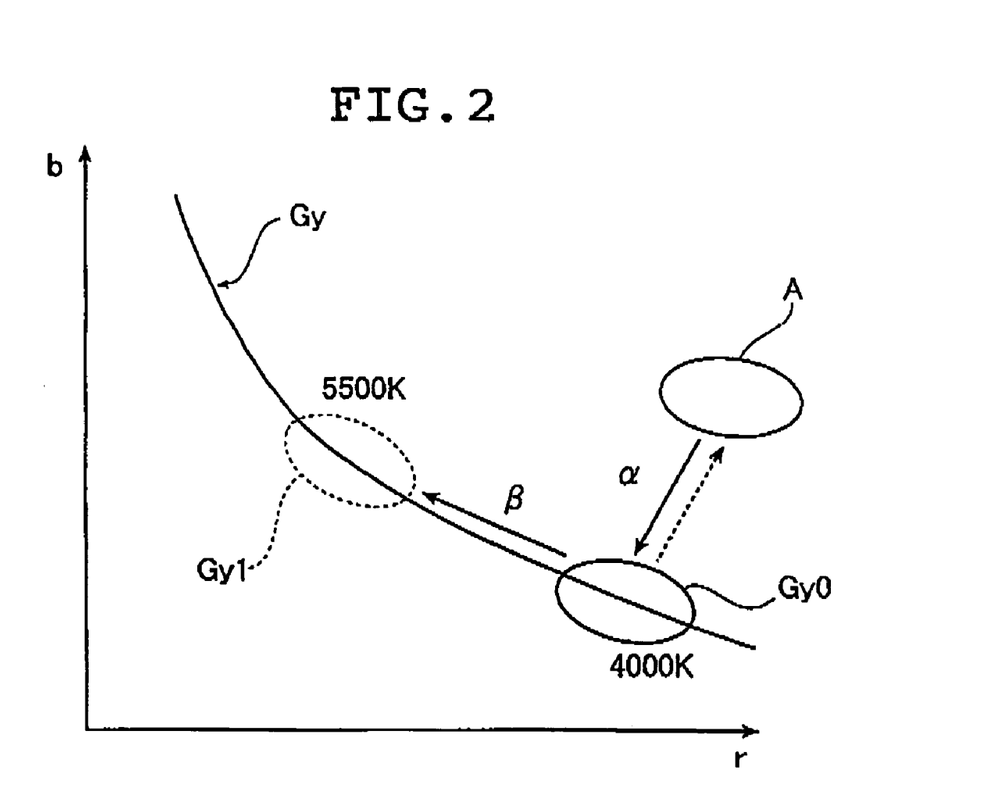
FIG. 2 is a chromaticity diagram for explaining the principle of white balance correction in the embodiment.

FIG. 2 shows the chromaticity diagram. A curve Gy in FIG. 2 is a blackbody locus of gray. As is well known, a blackbody locus is formed in such a manner that if T is color temperature; a blackbody radiation energy distribution at color temperature T is P(λ); a spectral reflectance distribution of a subject is ρ(λ); and a spectral sensitivity distribution of a CCD sensor is Si(λ) (where i=B, G, R), Ei is calculated by the following equation (2), $$Ei = \int P(\lambda)\rho(\lambda)Si(\lambda)d\lambda \qquad (2)$$

and this Ei is plotted in a chromaticity diagram by being converted into chromaticity coordinates (r, b) by the equation (1) shown above while color temperature T is changed.

Figure 3:
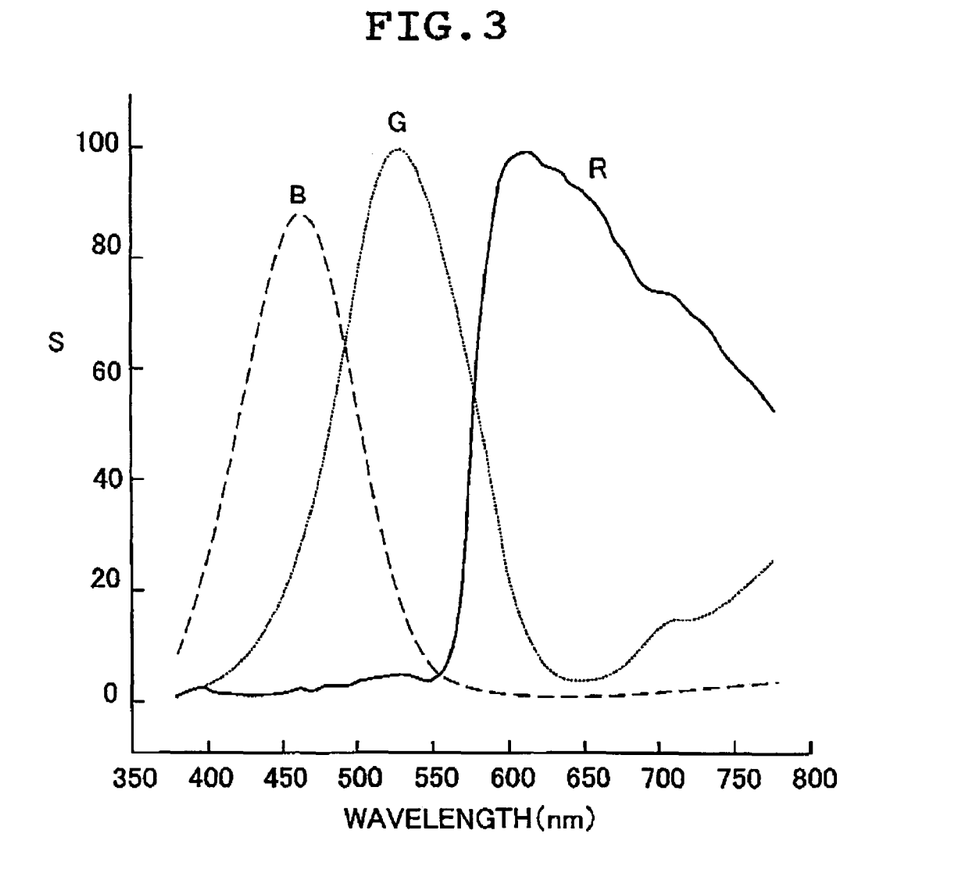
FIG. 3 is a graph showing spectral sensitivity distributions of a typical CCD sensor.
Figure 5:
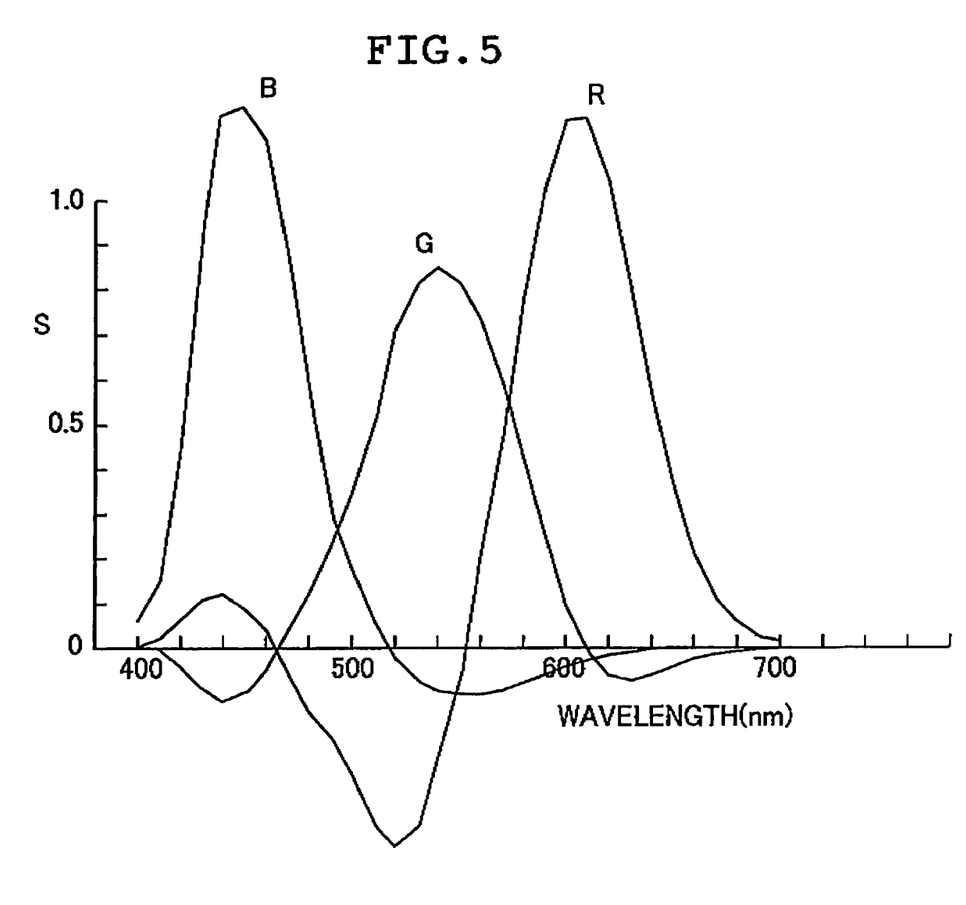
FIG. 5 is a diagram showing BT709 spectral sensitivity distributions.

A blackbody locus exists with respect to each of spectral distributions of a CCD sensor and each of the colors of a subject, and a blackbody locus of gray is obtained by setting the spectral reflectance ρ(λ) of a subject in gray to 1. FIG. 3 shows spectral sensitivity distributions of a typical CCD sensor. It is preferable to use such Si(λ) characteristic of a CCD sensor. However, BT709 ideal spectral sensitivity distributions such as shown in FIG. 5 may alternatively be used.

If the above-mentioned image signal of a gray portion is plotted in the chromaticity diagram shown in FIG. 2, it is considered to be scattered in the vicinity Gy0 of the point at 4000K on the blackbody locus of gray Gy.

In recent ordinary DSCs having an AWB (auto white balance) function, the gray portion is scattered in the vicinity Gy1 of a standard white (e.g., 5500K) if the AWB function is suitably performed. However, if the AWB function is not suitably performed, the gray portion is scattered in a region at an unknown position remote from the photographing temperature 4000K (e.g., a region indicated by symbol A in FIG. 2).

To convert the gray portion at such an unknown position indicated by symbol A in FIG. 2 to the vicinity Gy1 of a reference white (e.g., 5500K), white balance correction is made in a printer. It is possible to expect that a well-gray-balanced good print will be obtained by performing this conversion with respect to each of the pixels of the image.

Since the position of the region A is unknown, it is impossible to make a direct conversion from the region A to the vicinity Gy1 of a reference white (e.g., 5500K). Therefore, in the present invention, the desired conversion is performed in two steps.

That is, conversions expressed by two vectors α and β shown in FIG. 2 are made.

The vector α is a vector for correction of the amount of deviation from the blackbody locus Gy due to the imperfection of the AWB function of the DSC. The conversion using the vector α is performed as a conversion from the region A shown in FIG. 2 to the region Gy0 on the blackbody locus Gy.

The vector β is a vector for conversion from the region Gy0 to the vicinity Gy1 of the reference white (e.g., 5500K) along the blackbody locus Gy.

The conversion from the region A to the vicinity Gy1 of the reference white (e.g., 5500K) as shown in FIG. 2 can be achieved by combining the two vectors α and β.

The description will again be made of the devices and sections shown in FIG. 1.

It is difficult to obtain vector α expressing the conversion from the region A shown in FIG. 2 to the region Gy0 on the blackbody locus Gy in the above-described two conversion steps using vectors α and β. If the region Gy0 can be obtained, the color temperature T of the photographing light source can be estimated therefrom. Thus, it is easy to obtain the vector β expressing the conversion from Gy0 (color temperature T) to Gy1 (color temperature of 5500K) along the blackbody locus Gy.

The light source color temperature estimation device 12 obtains the vector α to make the corresponding conversion, and the image signal correction device 14 obtains the vector β to make the corresponding conversion.

The AWB function of the DSC is performed in such a manner that the image signals R, G, and B of all the pixels, which are collected immediately after photographing, are uniformly multiplied by constants. This multiplication using constants is a linear transformation. If the image signals have deviated from the blackbody locus by this operation, the process of making the gray portion scattered mainly at temperatures in the vicinity (Gy0 in FIG. 2) of the color temperature of the photographing light source on the blackbody locus (4000K in this case) must be the operation having the effect reverse to that of the operation performed as the AWB function.

The transformation which is the reverse of the above-described AWB function (linear transformation) of the DSC is also a linear transformation. Therefore the image signals R, G, and B are multiplied by predetermined coefficients (in the process shown in FIG. 2, the image signals R, G, and B are converted into chromaticity coordinates). The coefficient multiplication section 16 performs this multiplication.

The coefficient multiplication section 16 respectively multiplies R and G in the DSC image signals R, G and B by predetermined coefficients α1 and α2 as shown by the following equations (3) to convert R and G into R' and G'.

$$R' = \alpha 1 R$$
$$G' = \alpha 2 G \qquad (3)$$

For conversion in the coefficient multiplication section 16, it is not necessary to change the three signals; changing two of the signals may suffice.

The region to which the point corresponding to the original gray has been moved is unknown and it is impossible to identify the portion corresponding to the original gray. Therefore the gray candidate detection section 20 compares the signal converted by the linear transformation with the blackbody locus of gray, recognizes pixels detected in the vicinity of the blackbody locus as highly probable to correspond to the original gray, and sets the pixels as gray candidate pixels. Determination as to whether pixels are in the vicinity of the blackbody locus may be made according to whether the distance in terms of chromaticity coordinates (r, b) from the blackbody locus is within the range of 0.01.

The coefficient optimization section 22 counts the number of gray candidate pixels detected by the gray candidate detection section 20, and optimizes the coefficients α1 and α2 by making the coefficient multiplication section 16 and the gray candidate detection section 20 perform the above-described operations while changing the predetermined coefficients α1 and α2 so that the number of gray candidate pixels is maximized.

A suitable method, not particularly specified, may be used for this optimization. For example, a simplex method, which is a standard method for numerical value calculation, is preferably used. The coefficients α1 and α2 in the equations (3) for linear transformation are obtained by the above-described optimization as the components of vector α corresponding to the operation reverse to the AWB function of the DSC. That is, α=(α1, α2).

To improve the accuracy of optimization, information on a color other than gray may also be used. Skin color can be selected from subject colors as a color appearing frequently and comparatively stable in color tint among its variations. Skin color is thought to vary considerably with respect to human races (white race, yellow-skinned race, black race). However, it is known through spectrometric analysis that skin color varies mainly in lightness among races and does not vary largely in spectral composition, that is, skin color has only small variation in the color tint. This characteristic of skin color can be utilized for color identification.

Therefore the skin color candidate detection section 18 also sets a blackbody locus (not shown) with respect to skin color as well as that of gray, and detects skin color candidate pixels having a color close to the blackbody locus of skin color from the image signals multiplied by the coefficients in the coefficient multiplication section 16.

The coefficient optimization section 22 also counts the number of skin color candidate pixels detected by the skin color candidate detection section 18, combines it with the number of gray candidate pixels described above, and optimizes the coefficients $\alpha 1$ and $\alpha 2$ so that the number of these pixels is maximized, thus improving the accuracy with which the coefficients $\alpha 1$ and $\alpha 2$ are optimized.

It is also expected that if a scene including a gray portion and a skin color portion is photographed with uniform light, the average color temperatures of gray candidate pixels and skin color candidate pixels, detected as pixels having colors close to the blackbody locus, coincide with each other. In optimization in the coefficient optimization section 22, therefore, optimization of the above-described coefficients may be performed by setting an objective function for "minimizing the difference between the average color temperatures of gray candidate pixels and skin color candidate pixels".

Further, the two above-described methods may be combined to optimize the above-described coefficients by setting the objective function for "maximizing the number of gray candidate pixels and skin color candidate pixels" and the objective function for "minimizing the difference between the average color temperatures of gray candidate pixels and skin color candidate pixels".

The method using these two objective functions further improves the optimization accuracy.

The light source color temperature computation section 24 converts the image signals by using the coefficients $\alpha 1$ and $\alpha 2$ optimized in the above-described manner, computes the average color temperature Tg of the group of gray candidate pixels on the blackbody locus of gray and the average color temperature Tf of the group of skin color candidate pixels on the blackbody locus of skin color, and computes the color temperature T of the photographing light source from these average color temperatures. The color temperature T may be computed by averaging as shown by T=(Tg+Tf)/2 or may be obtained as T=Tg if gray is more important than skin color. The color temperature T of the photographing light source is thus estimated.

Finally, the image signal correction device 14 makes a conversion from the color temperature T to the reference white (e.g., 5500K) along the blackbody locus. This conversion can be expressed as linear transformation of the R- and B-signals shown by the following equations:

$$R''=\beta 1 R'$$

$$B''=\beta 2 B \quad (4)$$

These coefficients $\beta 1$ and $\beta 2$ are obtained as the components of vector $\beta$.

The image signal correction device 14 performs conversion using this vector $\beta$ on each pixel to complete white balance correction with respect to each pixel.

The above-described conversion process is summarized below. The conversion from the point A to the reference white (e.g., 5500K) Gy1 as shown in FIG. 2 is realized as a resultant of transformation by vector $\alpha$ and transformation by vector $\beta$, as shown by the following equations (5):

$$R''=\alpha 1 R$$

$$G''=\alpha 2 G$$

$$B''=\beta 2 B \quad (5)$$

The equations (5) include a change in lightness as well as a color balance. These equations may be rewritten as shown below by assuming the G signal is constant.

$$R''=(\alpha 1 \beta 1/\alpha 2)R$$

$$G''=G$$

$$B''=(\beta 2/\alpha 2)B \quad (6)$$

Figure 4:
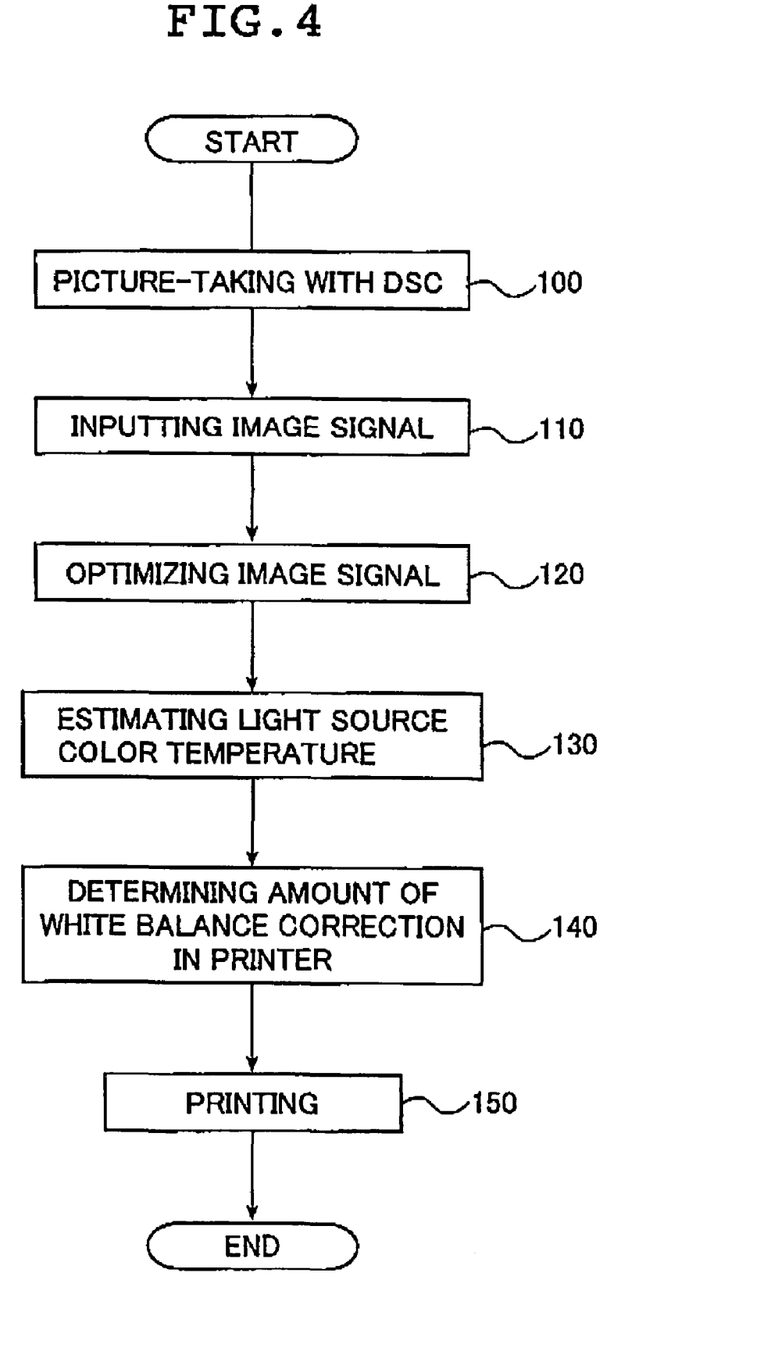
FIG. 4 is a flowchart showing a flow of processing in the embodiment.

The operation of this embodiment will be described with reference to the flowchart of FIG. 4.

First, in step 100, a scene is photographed in light from a certain light source by using a digital still camera (DSC).

In step 110, the image signals R, G, and B of the image formed by the DSC are input.

In step 120, image signal optimization processing is performed by the coefficient multiplication section 16, the skin color candidate detection section 18, the gray candidate detection section 20 and the coefficient optimization section 22 of the light source color temperature estimation device 12. This processing is intended to restore the image signals, which are caused to deviate from a blackbody locus by the AWB function of the DSC, to signals (raw data) without a deviation in the vicinity of the blackbody locus. The coefficient multiplication section 16 multiplies all the image signals by predetermined coefficients. The skin color candidate detection section 18 compares this data with the blackbody locus of skin color to detect data (skin color candidate pixels) considered to have a color in the vicinity of the skin color on the blackbody locus. The gray candidate detection section 20 compares this data with the blackbody locus of gray to detect data (gray candidate pixels) considered to have a color in the vicinity of the gray on the blackbody locus.

The coefficient optimization section 22 counts the detected skin color candidate pixels and the detected gray candidate pixels, and optimizes the above-described coefficients by resetting the coefficients and repeating setting the coefficients such that the number of the skin color candidate pixels and gray candidate pixels is maximized or the difference between the average color temperature of the group of skin color candidate pixels and the average color temperature of the group of gray candidate pixels is minimized, or both of these conditions are satisfied.

In step 130, the light source color temperature computation section 24 computes the estimated value T of the color temperature of the photographing light source from the average color temperature Tf of the group of skin color candidate pixels and the average color temperature Tg of the group of gray candidate pixels, obtained by multiplication by the optimized coefficients.

Next, in step 140, the image signal correction device determines the amount of correction from the estimated light source color temperature to the reference white (e.g., 5500K), and corrects the white balance of all the pixels by this amount of correction.

Finally, in step 150, other kinds of image processing are performed on the image signals, and a finished print is output from the printer.

The present invention will be further described with respect to concrete examples thereof.

EXAMPLE 1

The performance of the above-described white balance correction method was tested when prints were formed from 309 frames of DSC images obtained by picture-taking with typical two DSC models from Fuji Photo Film Co., Ltd. For comparison with the prints formed in accordance with the present invention, original images (prints which were output without correction after AWB in the DSCs) and prints which were obtained by performing on the images from the DSCs white balance correction based on the conventional art were prepared. The prints evaluated were sorted into good ones, unsatisfactory ones, and defective ones. Only the good ones were counted as passed items.

First, 8-bit DSC image signals were converted into subject-linear signals R0, G0, and B0, as described below.

8-bit DSC image signals R, G, and B obtained by picture-taking with the DSC are processed as described below. First, subject-linear signals R0, G0, and B0 generated from the CCD sensor are converted by gamma-0.45 nonlinear transformation shown by the following equations (7):

$$R1 = 1.099*R0**(0.45)-0.099$$

$$G1 = 1.099*G0**(0.45)-0.099$$

$$B1 = 1.099*B0**(0.45)-0.099 \quad (7)$$

Where the symbol * denotes a multiplication sign and the symbol ** denotes an exponentiation sign. Color-difference signals are formed therefrom as shown the following equations (8):

$$Y1=0.30R1+0.59G1+0.11B1$$

$$Cr1=0.70R1-0.59G1-0.11B1$$

$$Cb1=-0.30R1-0.59G1+0.89B1 \quad (8)$$

A color-difference matrix operation is performed on these signals to improve the chromaticity, thereby making conversions into color-difference signals Y2, Cr2, and Cb2 shown by the following equations (9):

$$Y2=Y1$$

$$Cr2=1.625Cr1+0.2734Cb1$$

$$Cb2=-0.08203Cr1+1.6094Cb1 \quad (9)$$

Finally, R, G and B signals are restored and converted into 8-bit signals by the following equations (10) to obtain 8-bit DSC image signals R, G, and B.

$$R=Y2+Cr2$$

$$G=Y2-0.51Cr2-0.18Cb2$$

$$B=Y2+Cb2 \quad (10)$$

To converts 8-bit DSC image signals R, G, and B into subject-linear signals R0, G0, and B0, therefore, the inverse operation process starting from processing R, G, and B signals and perform the operations in the order from equations (10), equations (9), equations (8), and equations (7) may be performed. This inverse operation process was performed to obtain the subject-linear signals R0, G0, and B0.

Next, the amounts of white balance correction based on optimization of subject-linear signals R0, G0, and B0 were computed.

To enable this computation, the blackbody locus of gray and the blackbody locus of skin color were formed in advance by using the spectral sensitivity of the DSC used for picture-taking. Operations for optimizing the R0, G0, and B0 signals were performed by using these loci to obtain vector α and vector β, and white balance correction signals R", G", and B" were obtained as shown by equations (11) below. This optimization computation was performed by optimizing the coefficients so that the number of gray candidate pixels and skin color candidate pixels was maximized and the difference between the average color temperature of the group of skin color candidate pixels and the average color temperature of the group of gray candidate pixels was minimized.

$$R"=(\alpha 1\beta 1/\alpha 2)R0$$

$$G"=G0$$

$$B"=(\beta 2/\alpha 2)B0 \quad (11)$$

To convert these white balance correction signals R", G", and B" into 8-bit image signals, the operations may successively be performed in the order of equations (7), equations (8), equations (9), and equations (10) These signals were output to obtain a white-balance-corrected print.

Table 1 shows the results of comparison between the prints after white balance correction in accordance with the present invention, the original images and those obtained by the conventional art.

TABLE 1

|  | Original images | Conventional art | Present Invention |
|---|---|---|---|
| Passing rate (%) | 65.3 | 78.3 | 90.0 |

As shown in Table 1, the passing rate of the present invention was higher by about 12 points than that of the conventional art, and the high white balance correction performance of the present invention was confirmed.

EXAMPLE 2

In Example 1, the names of DSCs were known and the spectral sensitivity and the color processing algorithm were also known. However, if the white balance correction method of the present invention is used as printing software, it is desirable to ensure applicability to correction of DSC images formed by unknown models (or to ensure robustness).

In Example 2, a white balance correction test was made with respect to 309 frames of DSC images obtained by picture-taking with typical two DSC models from Fuji Photo Film Co., Ltd, which are same as those used in Example 1, and 240 frames of images obtained by picture-taking of the same scenes (16 frames) with fifteen unidentified models from other manufactures.

In this example, white balance correction in accordance with the present invention was performed under the assumption that all models were DSCs having ideal spectral sensitivities, because, even if the model cannot be identified, the performance of any model can be approximated to the ideal spectral sensitivity characteristics of BT709 as shown in FIG. 5 by virtue of the combination of the spectral sensitivity and the color processing algorithm.

That is, in this example, the spectral sensitivity distributions of BT709 shown in FIG. 5 were used as spectral sensitivity distribution Si of the CCD sensor in equation (2) for obtaining a blackbody locus.

In this example, since DSCs having the ideal spectral sensitivities do not need the color processing algorithm for improving the chromaticity, it is not necessary to perform, for conversion of 8-bit DSC image signals R, G, and B into subject-linear signals R0, G0, and B0, the inverse operation process from equations (10) to equations (7) required in Example 1, and the inverse operation of equations (7) can be immediately performed.

The blackbody locus of gray and the blackbody locus of skin color were formed in advance by using the ideal spectral sensitivity of BT709, the operations for optimizing R0, G0, and B0 signals were performed by using these loci to obtain vector α and vector β, as in Example 1. White balance correction signals R", G", and B" expressed by equations (11) were obtained therefrom.

These signals were converted by gamma-0.45 nonlinear conversion and converted signals were 8-bit quantized to obtain 8-bit image signals, which were supplied to a printer to obtain a white-balance-corrected print.

The prints thus obtained were evaluated, as were those in Example 1. The prints evaluated were sorted into good ones, unsatisfactory ones, and defective ones. Only the good ones were counted as passed items. Table 2 shows the evaluation results.

TABLE 2

| Typical models from Fuji Photo Film Co., Ltd. (309 frames) | | 16 scenes (240 frames) by 15 models from other manufacturers | |
|---|---|---|---|
| Present invention | Original images | Conventional Art | Present invention |
| Passing rate (%) 88.0 | 47.1 | 70.0 | 76.2 |

As shown in Table 2, substantially the same passing rate (88%) as that in Example 1, though slightly lower, was maintained with respect to the typical models from Fuji Photo Film Co., Ltd. (309 frames). With respect to the fifteen models from the other manufacturers (240 frames), the absolute value of the passing rate achieved by the present invention was low (76%) but higher by about 6 points than that achieved by the conventional art.

The reason for the low passing rate may be because, as can be understood from the considerably low passing rate (47%) of the original images, the number of evaluated scenes was small (16 scenes) and the images had imbalance details, and not because the actual DSCs were assumed to be DSCs having ideal spectral sensitivities.

As described above, according to Example 2, the white balance correction method of the present invention is sufficiently effective when provided as common software and achieves a sufficiently high white balance correction effect even with respect to image forming apparatus models whose spectral sensitivity and color processing algorithm are unknown.

In the present embodiment of the present invention, as described above in detail, an algorithm using only gray and/or skin color information in a DSC image is constructed to correct white balance at the time of printing, and the apparatus and method of the present invention are advantageously effective in correcting white balance in comparison with the conventional art, as can also be understood from the examples. The effect of determining whether a color tint of the entire of an image is due to the photographing light source or the subject in accordance with the present invention, is advantageously improved in comparison with the conventional art having an imperfection with respect to this effect. In particular, the correction performance of the present invention is substantially perfect with respect to a high color temperature of a shaded scene or a scene under cloudy weather (7000 to 10,000K), so that while an entirely bluish print in which a human face has color subsidence is formed in such a situation by the conventional art, a print in which revived white is exhibited and in which skin color is natural can be obtained according to the present invention.

The above-described embodiment of the present invention has been described with respect to correction of DSC images, but the present invention is not limited to this. The white balance correction method of the present invention can also be applied to correction of images on color negative films.

Figure 6:
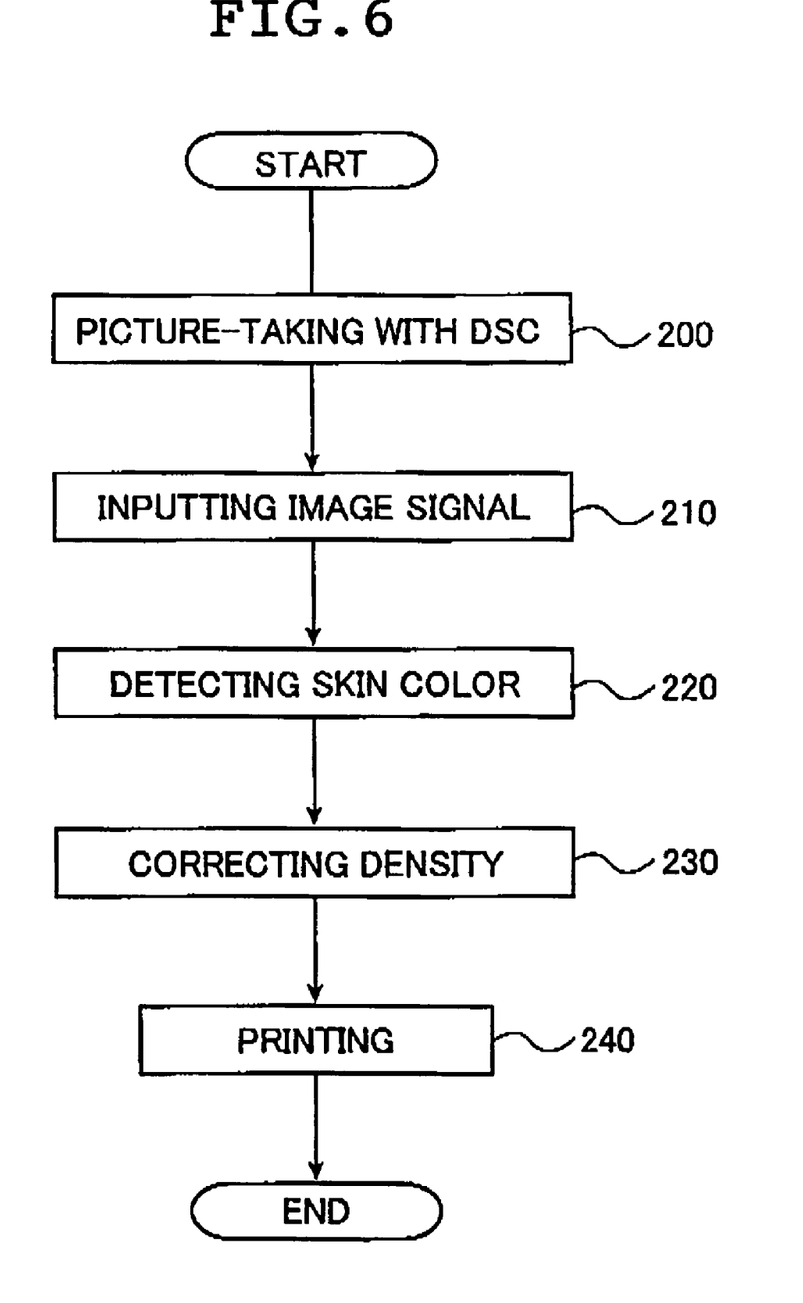
FIG. 6 is a flowchart showing a flow of processing in a second embodiment of the present invention.

Next, the method for correcting density as a second embodiment of the present invention is described with reference to the flowchart of FIG. 6. If the type of a light source is unknown, according to this method, skin color (not limited specifically to that of a face) in an image is detected utilizing the method for detecting skin color candidate pixels as stated above in the description of the first embodiment of the invention, and then the print density is determined based on the information about the color to form a proper print.

Apparatus for effecting the second embodiment of the invention are exemplified by a digital photoprinter comprising an image processor provided with the coefficient multiplication section 16, the skin color candidate detection section 18 and the coefficient optimization section 22 in the white balance correction apparatus 10 as stated above in the description of the first embodiment of the invention (and any other density correction means).

First in step 200, a scene is photographed in light from a certain light source by using a digital still camera (DSC) and then, in step 210, the image signals R, G and B of the formed image are input. In step 220, the input signals are subjected to the skin color candidate detection processing as stated above in the description of the first embodiment of the invention, so that skin color candidate pixels are detected. In particular, all the input image signals are multiplied by predetermined coefficients and the data thus obtained are compared with the blackbody locus of skin color to detect data, which are considered to be in the vicinity of the skin color on the blackbody locus, as skin color candidate pixels. At this time, the number of the detected skin color candidate pixels may additionally be counted and the coefficients for the multiplication as above may be optimized such that the above number is maximized, or such that the difference between the average color temperature of a group of detected skin color candidate pixels and the average color temperature of a group of gray candidate pixels obtained in a similar way to the skin color candidate pixels is minimized, or such that these two conditions are both satisfied, to perform the multiplication using the coefficients thus optimized and obtain skin color candidate pixels.

In the next step 230, density correction is performed. In particular, the average of the color signals (R, G and B) of the skin color candidate pixels detected as stated above is initially determined. For this purpose may be available the average of the color signals R, G and B [(R+G+B)/3], or any specific color signal, G signal, for example, The signal to be used is not particularly limited, although it is preferable to use G signal.

In the case of using G signal, density correction is performed by assigning the average obtained for G signal to a predetermined G density D (D=0.7, for example) on a print. The G density D is preferably between 0.7 and 1.0 both inclusive.

In step 240, the data obtained at the end of density correction are output by the printer.

In this way, even if the type of a photographing light source is unknown, the density of a human face as a main subject will be made proper by detecting skin color and performing density correction based on the information about the color. In consequence, a print can be properly finished.

As an example, density correction was performed with respect to an image formed by photographing with a DSC a back-lit scene (a scene where a person in the center is back-lit), which often fails to be properly photographed with a DSC under density correction by LATD method, and following results were obtained.

The print formed under density correction by LATD method was evidently not appropriate, because, although the density through the print was satisfactory, the face of the person looked pitch-dark.

In contrast, in the case of the print which was formed under density correction utilizing the detection of skin color according to the second embodiment of the invention, assuming that the type of a light source is unknown, the face of the person had a proper density, even though the background density was rather lower, the print being substantially satisfactory. This effected by virtue of the fact that skin color was successfully detected and printing was performed under density correction based on such a detection of skin color. Proper print densities could also be achieved with respect to other scenes than what is referred to above.

If one or both of the white balance correction method and the density correction method as described hereinabove are recorded as a computer-executable program on a computer-readable recording medium, the white balance correction method or the density correction method of the present invention may be carried out in a suitable apparatus such as an image processor by loading the program from the recording medium into the apparatus employed.

The apparatus for correcting white balance, the method for correcting white balance and the method for correcting density, as well as the recording medium on which a program for carrying out these methods is recorded, all of which the present invention provides, have been described in detail. Needless to say, the present invention is not limited to the described embodiments and examples, and various modifications and changes of the described embodiments and examples can be made without departing from the scope of the invention.

According to the present invention, as described above, an algorithm is constructed to correct white balance of an input color image of a subject photographed in light from a certain light source by estimating the color temperature of the photographing light source only from gray and/or skin color information contained in the input color image, thereby enabling suitable white balance correction at a high hit rate with respect to any input images regardless of DSC models used for forming images.

Moreover, by detecting skin color in an image and performing density correction based on the information about the color, the print density can be made proper even with respect to those images of scenes where it is difficult with prior arts to make the print density proper.

What is claimed is:

1. A method of correcting white balance, comprising the steps of:

estimating, by using at least gray and/or skin color information contained in an input color image, a color temperature of a photographing light source with which a color image has been formed; and correcting an image signal of the color image based on the estimated color temperature, wherein said estimating step includes:

multiplying image signals of each pixel in the input color image by set coefficients;

setting pixels having the multiplied image signals in the vicinity of a blackbody locus curve of skin color as skin color candidate pixels and/or pixels having the multiplied image signals in the vicinity of a blackbody locus curve of gray as gray candidate pixels;

optimizing the set coefficients so that the number of the skin color candidate pixels and/or the gray candidate pixels is maximized;

obtaining a group of skin color candidate pixels and/or a group of gray candidate pixels by using the optimized set coefficients; and estimating said color temperature of said photographing light source from an average color temperature of the group of skin color candidate pixels and/or an average color temperature of the group of gray candidate pixels, and wherein said image signals of the color image multiplied by the optimized set coefficients are corrected by an amount corresponding to a difference between the estimated color temperature and a color temperature of reference white.

2. The method according to claim 1, wherein only said gray and skin color information is used.

3. The method according to claim 1, wherein the color temperature of the photographing light source is estimated from the average color temperature of the group of skin color candidate pixels and the average color temperature of the group of gray candidate pixels obtained by optimizing the set coefficients so that the number of the skin color candidate pixels and the gray candidate pixels is maximized.

4. The method according to claim 1, wherein, when each of the blackbody locus curve of the skin color and/or the blackbody locus curve of the gray is set, a spectral sensitivity of a photographing apparatus used to form the input color image is used as a spectral sensitivity distribution.

5. The method according to claim 1, wherein, when each of the blackbody locus curve of the skin color and/or the blackbody locus curve of the gray is set, a spectral sensitivity of BT709 is used as a spectral sensitivity distribution.

6. A method of correcting white balance, comprising the steps of:

estimating, by using at least gray and/or skin color information contained in an input color image, a color temperature of a photographing light source with which a color image has been formed; and correcting an image signal of the color image based on the estimated color temperature, wherein said estimating step includes:

multiplying image signals of each pixel in the input color image by set coefficients;

setting pixels having the multiplied image signals in the vicinity of a blackbody locus curve of skin color as skin color candidate pixels and pixels having the multiplied image signals in the vicinity of a blackbody locus curve of gray as gray candidate pixels;

optimizing the set coefficients so that a difference between an average color temperature of the skin color candidate pixels and an average color temperature of the gray candidate pixels is minimized;

obtaining a group of skin color candidate pixels and/or a group of gray candidate pixels by using the optimized set coefficients; and estimating said color temperature of said photographing light source from an average color temperature of the group of skin color candidate pixels and the average color temperature of the group of gray candidate pixels, and wherein said image signals of the color image multiplied by the optimized set coefficients are corrected by an amount corresponding to a difference between the estimated color temperature and a color temperature of reference white.

7. The method according to claim 6, wherein only said gray and skin color information is used.

8. The method according to claim 6, wherein, when each of the blackbody locus curve of the skin color and the blackbody locus curve of the gray is set, a spectral sensitivity of a photographing apparatus used to form the input color image is used as a spectral sensitivity distribution.

9. The method according to claim 6, wherein, when each of the blackbody locus curve of the skin color and the blackbody locus curve of the gray is set, a spectral sensitivity of BT709 is used as a spectral sensitivity distribution.

10. A method of correcting white balance, comprising the steps of:

estimating, by using at least gray and/or skin color information contained in an input color image, a color temperature of a photographing light source with which a color image has been formed; and correcting an image signal of the color image based on the estimated color temperature, wherein said estimating step includes:

multiplying image signals of each pixel in the input color image by set coefficients;

setting pixels having the multiplied image signals in the vicinity of a blackbody locus curve of skin color as skin color candidate pixels and pixels having the multiplied image signals in the vicinity of a blackbody locus curve of gray as gray candidate pixels;

optimizing the set coefficients so that the number of skin color candidate pixels and the gray candidate pixels is maximized and a difference between an average color temperature of the skin color candidate pixels and an average color temperature of the gray candidate pixels is minimized;

obtaining a group of skin color candidate pixels and/or a group of gray candidate pixels by using the optimized set coefficients; and estimating said color temperature of said photographing light source from the average color temperatures of the group of skin color candidate pixels and the group of gray candidate pixels, and wherein said image signals of the color image multiplied by the optimized set coefficients are corrected by an amount corresponding to a difference between the estimated color temperature and a color temperature of reference white.

11. The method according to claim 10, wherein only said gray and skin color information is used.

12. The method according to claim 10, wherein, when each of the blackbody locus curve of the skin color and the blackbody locus curve of the gray is set, a spectral sensitivity of a photographing apparatus used to form the input color image is used as a spectral sensitivity distribution.

13. The method according to claim 10, wherein, when each of the blackbody locus curve of the skin color and the blackbody locus curve of the gray is set, a spectral sensitivity of BT709 is used as a spectral sensitivity distribution.

14. An apparatus according for correcting white balance when digital image processing is performed on an input color image to form a print, comprising:

an estimation device for estimating, by using at least gray and/or skin color information contained in the input color image, a color temperature of a photographing light source with which a color image has been formed; and a correction device for correcting an image signal of the color image based on the estimated color temperature, wherein said estimation device includes:

a multiplication device for multiplying image signals of each pixel in the input color image by set coefficients;

a detection device for detecting pixels having the multiplied image signals in the vicinity of a blackbody locus curve of skin color as skin color candidate pixels, and/or for detecting pixels having the multiplied signals in the vicinity of a blackbody locus curve of gray as gray candidate pixels;

an optimization device for optimizing the set coefficients so that the number of the skin color candidate pixels and/or the number of the gray candidate pixels is maximized, and/or for optimizing the set coefficients so that a difference between an average color temperature of the skin color candidate pixels and an average color temperature of the gray candidate pixels is minimized, to obtain a group of skin color candidate pixels and/or a group of the gray candidate pixels; and a computation device for calculating the color temperature of the photographing light source from the average color temperature of the group of skin color candidate pixels and/or the average color temperature of the group of gray candidate pixels, and wherein said correction device corrects the image signals of the color image multiplied by the optimized set coefficients, by an amount corresponding to a difference between the estimated color temperature and a color temperature of reference white.

15. A method of correcting density, comprising the steps of:

multiplying image signals of each pixel in an input color image by set coefficients to detect pixels having the multiplied image signals in the vicinity of a blackbody locus curve of skin color as skin color candidate pixels; and assigning an average obtained for a predetermined color signal from said skin color candidate pixels detected to a predetermined density of a color corresponding to said color signal on a print.

16. The method of correcting density according to claim 15, wherein said predetermined color signal is a green signal and an average green signal obtained from said skin color candidate pixels detected is assigned to a predetermined green density on a print.

17. A method of correcting density according to claim 16, wherein said predetermined green density is 0.7–1.0.

18. A recording medium on which one or both of a method of correcting white balance and a method of correcting density are recorded in a computer-readable manner as a program to be executed by a computer, wherein said method of correcting the white balance comprises the steps of:

estimating, by using at least gray and/or skin color information contained in an input color image, a color temperature of a photographing light source with which a color image has been formed; and correcting an image signal of the color image based on the estimated color temperature, and wherein said method of correcting the density comprises the steps of:

multiplying the image signals of each pixel in the input color image by the set coefficients to detect the pixels having the multiplied image signals in the vicinity of the blackbody locus curve of the skin color as the skin color candidate pixels; and assigning an average obtained for a predetermined color signal from said skin color candidate pixels detected to a predetermined density of a color corresponding to said color signal on a print.

* * * * *